Dec. 7, 1926.
J. HUGHES
LEVER
Filed April 19, 1923
1,609,719
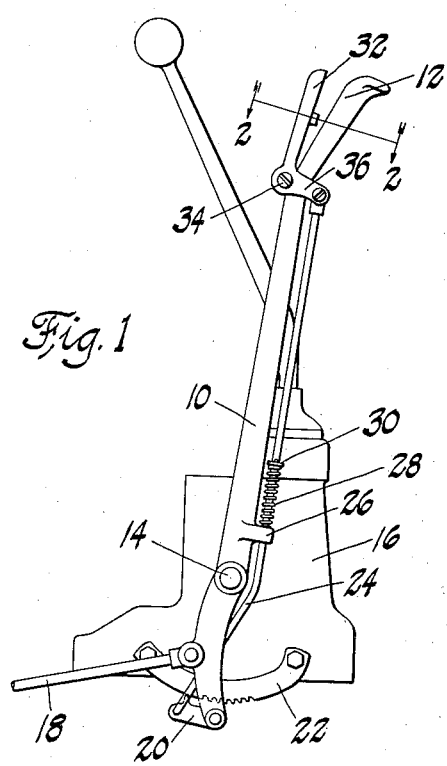
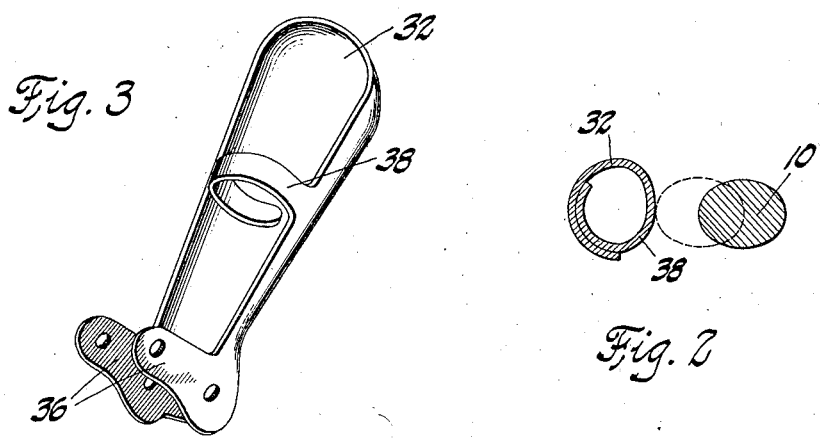
Inventor
John Hughes
By his Attorneys Patented Dec. 7, 1926.

1,609,719

UNITED STATES PATENT OFFICE.

JOHN HUGHES, OF FLINT, MICHIGAN, ASSIGNOR TO GENERAL MOTORS CORPORATION, OF DETROIT, MICHIGAN, A CORPORATION OF DELAWARE.

LEVER.

Application filed April 19, 1923. Serial No. 633,211.

This invention relates to levers and is illustrated as embodied in the emergency brake lever of an automobile.

An object of the invention is to limit movement of the latch-controlling member of such a lever, to prevent pinching the operator's hand between said member and the lever. While useful in levers of many kinds, this construction is especially well adapted for emergency brake levers, inasmuch as such a lever is usually shifted by the driver when he is not looking at it.

In one form, the invention provides for a stop between the latch-controlling member and the lever, which limits their movement toward one another. In the embodiment illustrated in the drawings, this stop is integral with the latch-controlling member, which is shown as a bell crank lever of sheet metal pivotally mounted on the upper end of the emergency brake lever. For convenience of manufacture, and to provide some resilience in the stop, I prefer to use for the stop a curled finger projecting from one edge of the concave sheet metal bell crank lever, and which extends across the concavity and is bent to engage the inside surface adjacent the opposite edge.

The above and other features and objects of the invention, including various novel combinations and desirable particular constructions of parts, will be apparent from the following description of the illustrative embodiment shown in the accompanying drawings, in which:

Figure 1 is a side elevation showing the emergency brake lever mounted on one side of the transmission casing;

Figure 2 is a section on the line 2—2 of Figure 1 showing the stop finger in cross section; and Figure 3 is a perspective view of the above described sheet metal latch-controlling bell crank lever with the resilient integral stop finger.

In the particular embodiment selected for illustration, the invention is applied to an emergency brake lever 10 having an upper handle portion 12 and pivoted at 14 on a transmission casing 16, or on any other suitable support. A link 18 is operated by the lever to set the brakes in the usual manner. In order to maintain the lever in any position of adjustment, to hold the brakes on or off as the case may be, a pawl or latch 20 is pivotally mounted on the lower end of the lever and is provided with one or more teeth arranged to engage a ratchet member 22, which is shown as being fastened to the transmission casing. The latch is operated by a link 24 sliding through a perforated lug 26 and normally held in its upper position to cause the latch to engage the ratchet by a coil spring 28 confined between the lug 26 and a collar 30 secured on the link. This link is pivotally connected at its upper end to a novel sheet metal latch-controlling bell crank lever 32, which is shown detached in Figure 3.

The bell crank lever 32 is pivoted at 34 to the emergency brake lever 10 immediately below the handle portion 12, and is provided with a pair of parallel arms 36 which are connected to the link 24 as described above. This lever is shown as being stamped from sheet metal in such a manner that the side next handle 12 is concave so that the opposite side presents a smooth convex surface to engage the driver's hand.

According to the present invention, movement of the latch-controlling member or lever 32 toward handle 12 is limited to prevent pinching the driver's hand by a stop which is shown as being in the form of an integral resilient finger 38. This finger projects from one edge of the concave face of the lever 32, and curves across the concavity in such a manner that its end curls within the concave portion of the lever and slidingly engages the inner surface of the concavity adjacent the opposite edge. This arrangement provides a construction which is especially well adapted for economical manufacture in large quantities, and it has the further advantage of making the stop somewhat resilient.

While one illustrative embodiment of the invention has been described in detail, it is not my intention to limit its scope to that embodiment or otherwise than by the terms of the appended claims.

I claim:

1. A latch-controlling bell crank lever of sheet metal pressed into a concave form and having an integral finger projecting from one side of the concavity and bent into a position adjacent the opposite side of the concavity.

2. A latch-controlling bell crank lever of sheet metal pressed into concave form on one side to provide a hand-engaging convexity on the opposite side, and having a pair of parallel link-operating arms projecting from one end and a finger projecting from one side of said concavity, the finger being bent across the concavity into such a position that its end engages and bears against the interior surface of the opposite side of the concavity.

3. A brake lever having a handle, a latch, a link connected with the latch, a spring on said link for holding said latch in locked position, an operating member for the latch mounted adjacent said handle, and a resilient spacing device between the operating member and the handle.

4. A brake lever having a handle, a latch, a link connected with the latch, a spring for holding said latch in locked position, an operating member for the latch mounted adjacent said handle, and a resilient stop projecting from one side of said member between said member and the handle.

5. A brake lever having a handle, a latch, a link connected with the latch, a spring for holding said latch in locked position, an operating member for the latch mounted adjacent said handle, and a stop between the operating member and the handle serving to prevent the operating member from coming in contact with the handle and pinching the operator's hand.

In testimony whereof I affix my signature.

JOHN HUGHES.